United States Patent [19]

Imazeki

[11] 4,368,511
[45] Jan. 11, 1983

[54] NUMERICAL CONTROLLING METHOD AND SYSTEM

[75] Inventor: Ryoji Imazeki, Hachioji, Japan

[73] Assignee: Fujitsu Fanuc Limited, Tokyo, Japan

[21] Appl. No.: 183,038

[22] Filed: Sep. 2, 1980

[30] Foreign Application Priority Data

Sep. 4, 1979 [JP] Japan .............................. 54-113254

[51] Int. Cl.³ ..................... G06F 3/04; G05B 19/18; G06F 15/46
[52] U.S. Cl. .................................. 364/167; 364/138; 364/474; 364/900
[58] Field of Search ............... 364/474, 475, 138, 167, 364/200 MS File, 900 MS File; 318/562, 567, 569

[56] References Cited

U.S. PATENT DOCUMENTS

| | | | |
|---|---|---|---|
| 3,895,355 | 7/1975 | Shorrock | 364/900 |
| 3,898,373 | 8/1975 | Walsh | 364/200 X |
| 4,008,461 | 2/1977 | Raven | 364/900 |
| 4,071,911 | 1/1978 | Mazur | 364/900 |
| 4,200,936 | 4/1980 | Borczik et al. | 364/900 |
| 4,215,395 | 7/1980 | Bunyard et al. | 364/200 X |

*Primary Examiner*—Joseph F. Ruggiero
*Attorney, Agent, or Firm*—Staas & Halsey

[57] ABSTRACT

Disclosed are a numerical controlling method and system for controlling a machine such as a machine tool, robot or the like, through an exchange of data between the machine and a numerical controlling apparatus.

The system includes conversion circuits incorporated in both of the numerical control apparatus and the machine, the conversion circuits being adapted to convert serial data into parallel data and vice versa; a cable connected between the conversion circuits; an address signal generating circuit adapted to generate an address signal; and a decoder circuit incorporated in the machine and adapted to decode the address signal.

The parallel data is converted into serial data so that the exchange of the data is made between the machine and the numerical control apparatus in a bit-serial manner through the cable, so that the machine elements corresponding to the address signals are activated in accordance with the data transmitted bit-serially from the numerical control apparatus or, alternatively, the states of the machine elements corresponding to the address signals are read in a parallel manner and transmitted bit-serially to the numerical control apparatus.

4 Claims, 3 Drawing Figures

NUMERICAL CONTROLLING METHOD AND SYSTEM

BACKGROUND OF THE INVENTION

The present invention relates to a numerical controlling method, as well as to a numerical controlling system, and, more particularly, to a numerical controlling method and system which permit a reduction of the number of cables between the numerical control apparatus and the machine to be controlled.

In a numerical controlling system having a numerical controlling apparatus and a machine to be controlled such as machine tool, robot or the like, the desired control of machining or robot tasks is performed through the exchange of signals between the numerical control apparatus and the machine. For instance, various commands such as miscellaneous function commands (M function commands), tool exchange commands (T function commands), spindle rotation speed commands (S function commands) and so forth are derived from a punched paper tape or the like. When such a command is issued, the numerical control apparatus delivers the command to the machine side so that the machine actuates machine elements such as relays in accordance with the delivered command. When the operation is completed in compliance with the command, the machine produces and sends an operation completion signal FIN back to the numerical control apparatus. Various limit switches, such as over-travel detection switches, as well as sensors, are provided on the machine side. The states of these limit switches and sensors are transmitted to the numerical control apparatus to enable the latter to perform the necessary processing operations.

In the conventional numerical controlling system, the numerical control apparatus and the machine are connected by a numerous data transmitting cables, resulting in complicated wiring and high expense. This problem is particularly serious when the machine is located at a distance from the numerical control apparatus.

SUMMARY OF THE INVENTION

It is, therefore, an object of the invention to provide a numerical controlling method and system which permits a reduction of the number of cables connected between the numerical control apparatus and the machine to be controlled.

It is another object of the invention to provide a numerical controlling method and system in which data is transmitted and exchanged in a bit-serial manner between the numerical control apparatus and the machine.

It is a further object of the invention to provide a numerical controlling method and system, wherein an address signal transmitted from the numerical control apparatus or an address signal produced at the machine side is decoded by a decoder circuit provided on the machine side, the data transmitted from the numerical control apparatus being delivered to the desired circuit in accordance with the decoded result to thereby attain the desired machine control.

It is a still further object of the invention to provide a numerical controlling method and system, wherein the data transmission is efficiently performed by making use of the vacant time of bus line, thanks to the provision of a direct memory access controller which permits direct access to the memory and direct writing and reading of data into and out of the memory.

Other features and advantages of the invention will be apparent from the following description taken in conjunction with the accompanying drawing.

DESCRIPTION OF THE PREFERRED EMBODIMENTS

Figure 1:
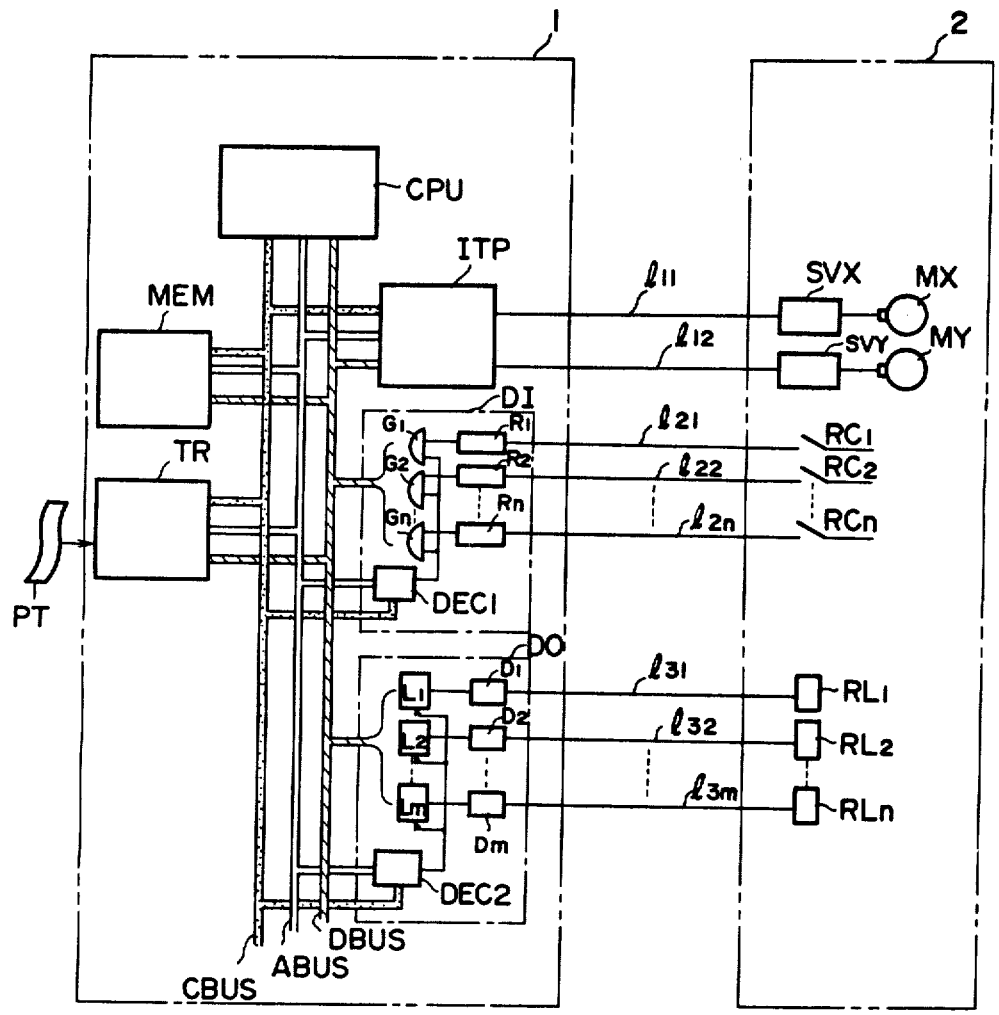
FIG. 1 is a block diagram of a conventional numerical controlling system.

Referring first to FIG. 1, which illustrates a block diagram of a conventional numerical controlling system, reference numeral 1 denotes a computer-equipped numerical control apparatus having ordinary construction. A central processing unit CPU, which may be a microprocessor, is adapted to execute the desired numerical control process in accordance with the control program and machining program. A memory MEM has an area for storing or memorizing parameters such as acceleration and deceleration time constants, as well as other data such as the present position of the tool, an area for storing the control program, and an area for storing data such as addresses corresponding to the signals transmitted from the machine side. The symbol PT represents a paper tape in which the machining program is stored by punching. A pulse distributor ITP is adapted to execute a known pulse distribution operation to produce distribution pulses Xp and Yp, upon receipt of feed speed command F, and X and Y-axes displacement commands X and Y, which are read out from the paper tape PT by a tape reader TR.

A data input circuit DI incorporates receivers $R_1$ through $R_n$ adapted to receive signals transmitted from various limit switches, relays and so forth on the machine side, AND gates $G_1$ through $G_n$, and a decoder $DEC_1$ adapted to decode the address signals to open the desired AND gate.

A data output circuit DO includes a multiplicity of latch circuits $L_1$ through $L_m$ for memorizing various commands such as a two-digit (eight bit) M function command in the form of a binary code decimal (BCD) number, a two-digit BCD S function command, a two-digit BCD T function command, and so forth, drivers $D_1$ through $D_m$ corresponding to the latch circuits $L_1$ through $L_m$, the drivers being adapted to send the latch circuit output signals to the machine tool, and a decoder $DEC_2$ which allows prescribed latch circuits to be set or reset upon decoding the address signals.

A control signal bus CBUS is provided for carrying the control signals. An address bus for transferring address signals and a data bus for transferring various data are represented by ABUS and DBUS, respectively. Cables $l_{11}$ and $l_{12}$, $l_{21}$ through $l_{2n}$ and $l_{31}$ through $l_{3m}$ are provided for data exchange between the numerical control apparatus and the machine. The machine tool to be controlled is designated as reference numeral 2.

Servo control circuits SVX and SVY are adapted to drive the servo motors MX and MY upon receipt of the distribution pulses Xp and Yp, respectively. Symbols $RC_1$ through $RC_n$ represent, for example, relay contacts adapted to open and close in accordance with the states of over travel limit switches, for X and Y directions, deceleration limit switches and so forth, and deliver their outputs to the receivers $R_1$ through $R_n$ of the numerical control apparatus via the cables $l_{21}$ through $l_{2n}$. Relays $RL_1$ through $RL_m$ are adapted to operate in response to the drivers $D_1$ through $D_m$ of the numerical control apparatus so as to perform various machine controls such as spindle rotation control, spindle speed control, tool change control, and so forth.

The numerical controlling system shown in FIG. 1 operates in the manner described below.

A machining program consisting of a multiplicity of blocks is stored in the paper tape PT by punching. The position command information (feed speed information F, position information X, Y) is read by the tape reader TR out of the blocks. This information F, X, Y is delivered to the pulse distributor ITP. The pulse distributor ITP executes a known pulse distribution operation and produces output pulses $X_p$, $Y_p$ which are delivered to the machine side servo control circuits SVX, SVY through the cables $l_{11}$ through $l_{12}$ so as to drive the motors MX and MY and thereby control the movement of a movable part such as a tool, table or the like in accordance with the command.

On the other hand, assuming that the block information read by the tape reader TR from the paper tape PT is an M function command, "M03," for example, the processing unit delivers an address signal AD(m) corresponding to the M function to the address bus ABUS, and transmits through the control signal bus CBUS a control signal for actuating only the decoder $DEC_2$. At the same time, the processing unit delivers a signal "03" (0000 0011) to the data bus DBUS.

The address signal AD(m) is decoded by the decoder $DEC_2$, and only the eight latches $L_1$ through $L_8$ for storing the two-digit (eight bit) M function command in the form of a binary coded decimal are enabled, allowing them to be set or reset. In consequence, the data "03" (0000 0011) on the data bus DBUS is provided to latches $L_1$ through $L_8$. More specifically, latches $L_1$ and $L_2$ are set while the latches $L_3$ through $L_8$ are reset. The data is then transmitted to the machine 2 via the cables $l_{31}$ through $l_{38}$ to control the relays $RL_1$ through $RL_8$.

In consequence, supposing that the command "M03" is a miscellaneous function command for turning the coolant on, the machine 2 responds to turn the flow of coolant on.

The reading of the contact signals $RC_1$ through $RC_n$ transmitted from the machine 2 to the numerical control apparatus is conducted as follows.

Addresses $AD(rC_1)$, $AD(rC_2)$ ... $AD(rCn)$, corresponding to the contact signals $RC_1$, $RC_2$ ... $RCn$, are memorized in order in the address storage area of the memory MEM. As the numerical control apparatus starts to operate, the central processing unit CPU reads out the addresses $AD(rC_1)$, $AD(rC_2)$, ... $AD(rCn)$ successively, making use of the idle time of each bus line, and transmits these addresses to the address bus ABUS. At the same time, the central processing unit CPU transmits the control signal through the control signal bus CBUS in order to permit only the decoder $DEC_1$ to operate. Therefore, only the AND gate $G_1$ is opened when the address $AD(rC_1)$ appears at the address bus ABUS, and the contact signal $RC_1$ appears on the data bus DBUS (through the line $l_{21}$, receiver $R_1$ and the AND gate $G_1$) and is picked up by the central processing unit CPU to enable the latter to execute a predetermined processing operation in accordance with this signal. Contact signals $RC_2$, $RC_3$ ... $RCn$ are thereafter sequentially taken up by the central processing unit CPU in the same manner as the contact signal $RC_1$. After the completion of the reading of $RCn$, the contact signals $RC_1$, $RC_2$ ... are read again. Although in the illustrated example the contact signals are read one by one, this arrangement is not exclusive. That is, it is possible to read a plurality of contact signals at one time, by providing that a plurality of address gates are opened for one address.

As will be understood from the foregoing description, in the conventional numerical controlling system numerous cables are connected between the numerical control apparatus 1 and the machine 2, resulting in a complicated wiring arrangement and increased cost of the system as a whole.

These problems, however, are avoided in the numerical controlling method and system of the invention, as will be fully understood from the following description.

Figure 2:
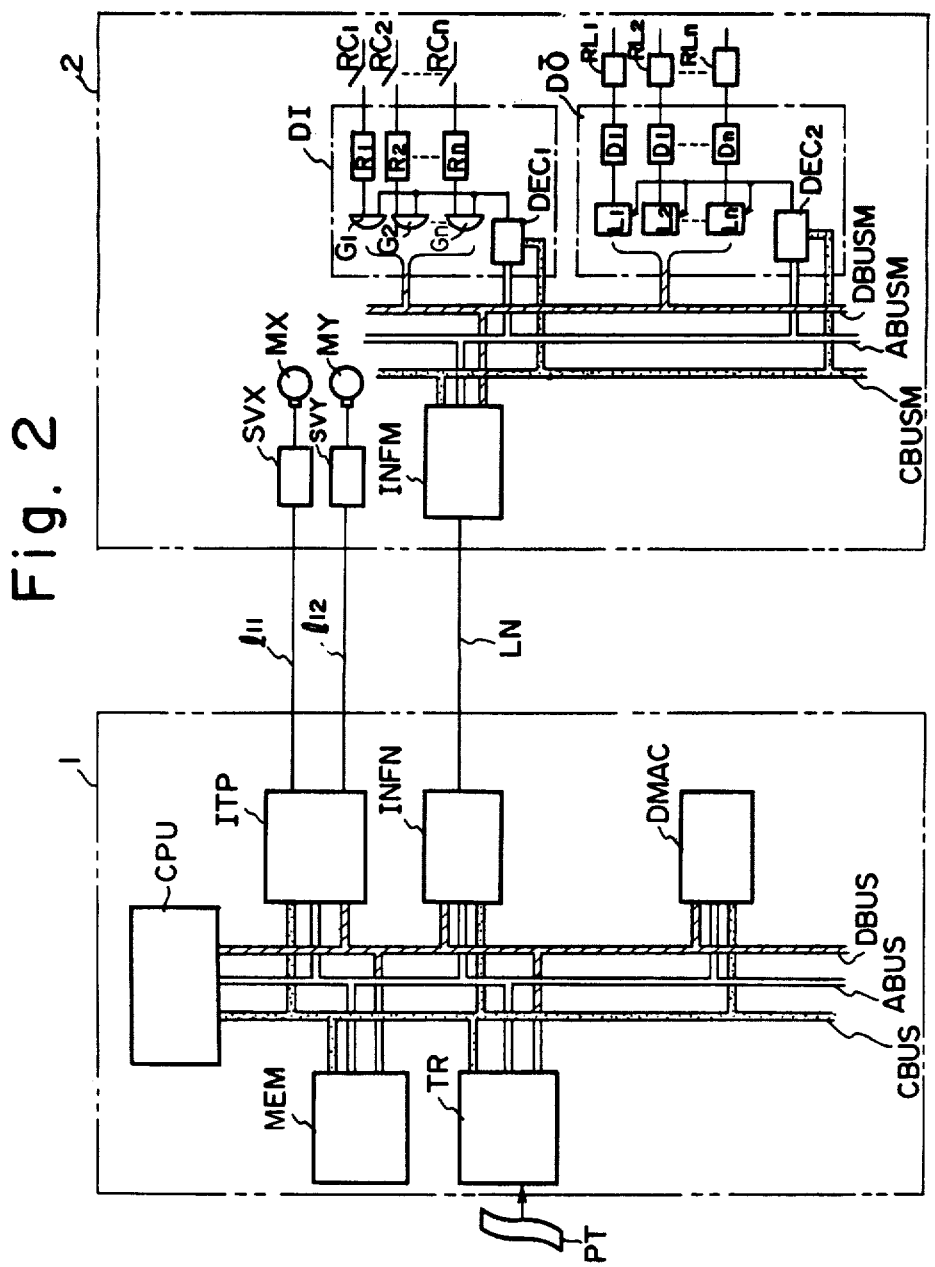
FIG. 2 is a block diagram of a numerical controlling system in accordance with an embodiment of the invention.

FIG. 2 is a circuit block diagram of a circuit embodying the numerical controlling method and system of the present invention, in which the same reference numericals are used to denote the same parts as those of the conventional system shown in FIG. 1, and a detailed description of such parts is omitted.

Referring to FIG. 2, an interface circuit INFN incorporated in the numerical control apparatus 1 is adapted to convert the parallel information into serial information (this conversion is referred to as a P/S conversion) and delivers the serial information as its output. The interface circuit INFN is further provided with conversion means for converting the serial information transmitted from the machine side in a bit-serial manner into parallel information (this conversion is referred to as a S/P conversion).

A direct memory access controller DMAC is adapted to make a direct access to the memory MEM and to write and read the data into and out of the latter, in accordance with commands issued from the central processing unit CPU. That is, when the central processing unit CPU issues a command for a transfer of N-byte data from a predetermined address of the memory MEM, the direct memory access controller DMAC cyclically reads out the stored data byte by byte directly from the predetermined address, making use of the idle time of the bus lines, and transmits the read-out data to the interface circuit INFN. The exchange of data between the machine 2 and the numerical control apparatus 2 is made through a cable LN.

An interface circuit INFM incorporated in the machine 2 is provided with P/S conversion means and S/P conversion means, as in the case of the interface circuit INFN of the numerical control apparatus 1. A control signal bus, address bus and data bus on the machine side are represented by CBUSM, ABUSM and DBUSM, respectively.

The numerical controlling system shown in FIG. 2 differs from the conventional system shown in FIG. 1 in the following respects.

(1) Taking the cables $l_{11}$ and $l_{12}$ out of consideration, the exchange of data between the numerical control apparatus 1 and the machine 2 is made through a sole cable LN.

(2) The numerical control apparatus 1 and the machine 2 are provided with interface circuits INFN and INFM, respectively.

(3) The machine is provided with a data input circuit DI and a data output circuit DO.

The numerical controlling system shown in FIG. 2 operates in the manner explained below.

It is assumed here that the M function command "M03" is read out of the paper tape PT by the tape reader TR. The following operation, however, is performed even when another command, such as an S function command or a T function command, is read out.

When the above-mentioned M function "M03" is read out, the two-digit signal "03" is stored in memory MEM at a predetermined address in BCD form.

On the other hand, the direct memory access controller DMAC, which is ordered by the central processing unit CPU to cyclically read N-byte information out of addresses $AD_1$ through $AD_N$, reads out this information from the memory MEM and delivers the same to the interface circuit INFN, making use of the idle time of the bus lines CBUS, ABUS and DBUS.

Therefore, provided that the control signal for permitting only the decoder $DEC_2$ to operate, together with the address AD(m) of the M function and the two-digit data "03" of BCD, is stored in a predetermined address $AD_i$ (i=1, 2, .... N), the direct memory access controller DMAC reads the above-mentioned control signal, the address AD(m) and the data (BCD two-digit "03") out of the address AD1 of the memory MEM and delivers the same to the interface circuit INFN. The interface circuit INFN delivers the information read out of the memory MEM to the interface circuit INFM of the machine 2 in a bit-serial manner through the cable LN, after a P/S conversion. The interface circuit INFM of the machine then effects an S/P conversion of the serial information, which has been transferred in the bit-serial manner and consists of the aforementioned control signal, address and the data, to convert the information into parallel information, and delivers the control signal, address AD(m) and the BCD two-digit data "03" to the control signal bus CBUS, address bus ABUS and the data bus DBUS, respectively.

In consequence, only the decoder $DEC_2$ becomes operative and decodes the address AD(m), so as to allow the setting and resetting of only the latches $L_1$ through $L_8$, which are adapted to store the two-digit (8 bit) M function command. In consequence, the latches $L_1$ and $L_2$ are set, while the latches $L_3$ to $L_8$ are reset by the BCD two-digit data "03," so that the relays $RL_1$ and $RL_2$ are turned on, while the relays $RL_3$ through $RL_8$ are turned off through the action of the drivers $D_1$ through $D_8$, so that the machine operation, such as the turning on of the flow of coolant, is conducted. Although the control signal, the address AD(m) and the BCD two-digit data have been described as being stored at a single or common address in the memory MEM, they may be stored at independent addresses.

The transmission of the commands such as the M, S and T function commands, from the numerical control apparatus to the machine 2 is conducted in the manner explained above.

An explanation will now be given as to the reading of contact signals, such as the output from limit switches, from the machine 2.

For reading out the on/off state of the relay contacts $RC_1$ through $RC_8$, a control signal for permitting the operation of only the decoder $DEC_1$ is stored at a predetermined address $AD_j$ of the memory MEM, together with the address information $AD(rC_{18})$ corresponding to the contacts $RC_1$ through $RC_8$, although the control signal and the address information $AD(rC_{18})$ may be stored at independent addresses. The direct memory access controller DMAC reads the control signal and the address information $AD(rC_{18})$ from the address $AD_j$ of the memory MEM and delivers the same to the interface circuit INFN through the data bus DBUS. The interface circuit INFN then transmits, after a P/S conversion, the control signal and the address $AD(rC_{18})$ in a bit-serial manner through the cable LN to the interface circuit INFM of the machine 2. The interface circuit INFM then effects an S/P conversion of the bit-serially transmitted control signal and the address information $(AD(rC_{18})$, and delivers the control signal and the address information to the control signal bus CBUSM and to the address bus ABUSM, respectively.

In consequence, only the decoder $DEC_1$ becomes operative, and decodes the address information $AD(rC_{18})$ to open the AND gates $G_1$ to $G_8$. In consequence, the states of the relay contacts $RC_1$ through $RC_8$ are transferred to the data bus DBUSM.

The interface circuit INFM, upon receipt of the 8-bit contact signal (data), effects a P/S conversion of the data and sends the same in a bit-serial manner to the interface circuit INFN of the numerical control apparatus 1, via the cable LN. The interface circuit INFN then effects an S/P conversion of the bit-serially transmitted data to send the same to the central processing unit CPU through the data bus DBUS. The reading of the other contact signals $RC_9$ through $RC_n$ is performed in the same manner, so that all of the contact signals are read by the numerical control apparatus 1.

In the foregoing description taken in conjunction with FIG. 2, the control signal, address and the data are stored at the same address of the memory. This, however, is not exclusive. That is, it is possible to store the control signal, address and the data at different address and to read and bit-serially transfer them successively to the machine side.

It is also possible to use three cables for bit-serially transferring the control signal, address and the data, although only one cable is used for the transfer of the control signal, address and the data in the described embodiment. It is also possible to use different cables for the transfer from the numerical control apparatus to the machine and for the transfer from the machine to the numerical control apparatus. This arrangement is advantageous in that the data transfer time is shortened considerably.

The use of control buses CBUS, and CBUSM is not essential and can be neglected. In such a case, only the address and the data are transferred.

In the embodiment shown in FIG. 2, the address signal is exchanged in a bit-serial manner between the numerical control apparatus 1 and the machine 2. The exchange of the address signal, however, may be omitted if the machine 2 is provided with an address signal generating circuit adapted to be triggered by a synchronizing signal delivered by the numerical control apparatus 1 to the machine 2. That is, the transfer of the address signal can be neglected by making the address signal generating circuit generate the address signal in synchronism with the transfer of the data read out from the memory MEM.

Figure 3:
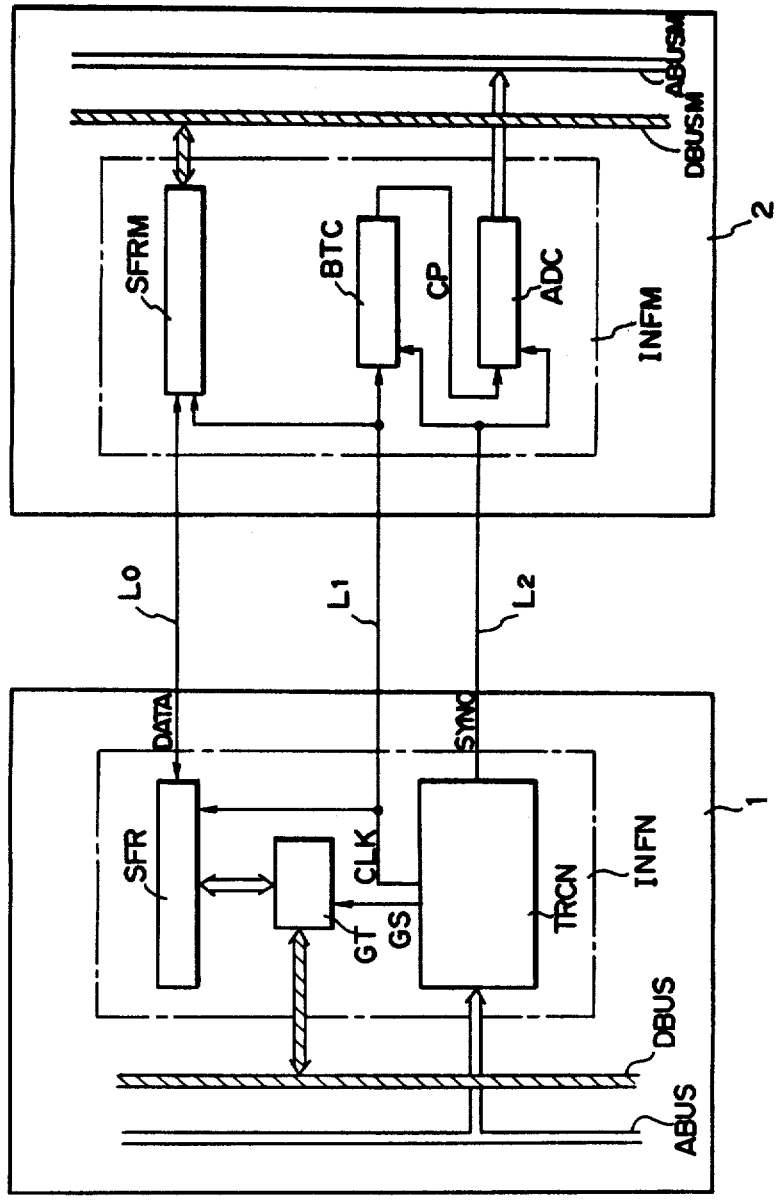
FIG. 3 is a block diagram of a numerical controlling system in accordance with another embodiment of the invention.

FIG. 3 is a block diagram of a numerical controlling system constructed in accordance with another embodiment of the invention in which the address signal is generated at the machine side. In FIG. 3, the parts similar or identical to those of FIG. 2 are designated by the same reference numerals, and the detailed descriptions thereof are omitted.

Referring to FIG. 3, a shift register SFR is adapted to performing parallel writing and reading, as well as serial writing and reading. A gate GT controls the writing and reading of the data into and out of the shift register SFR. A transfer control circuit TRCN produces a clock pulse CLK at the transfer of the data and produces a synchronization signal SYNC in advance of the operation of the direct memory access controller DMAC (FIG. 2). The transfer control circuit TRCN is further adapted to control the state of the gate circuit GT by generating a gate signal GS upon in accordance with an address signal which is delivered through the address bus ABUS.

A shift register SFRM permits, as in the case of the aforementioned shift register SFR, parallel writing and reading, as well as serial writing and reading, of the data. A bit counter BTC has a capacity equal to the bit number or word length (8 bits) of one item of parallel data, and is adapted to count the clock pulses delivered by the numerical control apparatus 1. The bit counter produces one carry pulse CP each time it counts 8 (eight) clock pulses CLK, i.e., at each transfer of 8 bits of data. An address counter ADC counts the carry pulses CP and delivers the counted number to the address bus ABUSM as the address signal.

Although omitted from the drawings, the central processing unit CPU, memory MEM, direct memory access controller DMAC, pulse distributor ITP, tape reader TR, data input circuit DI, data output circuit DO, relays $RL_1$ through $RL_m$, contacts $RC_1$ through $RC_m$ and so forth are included by the system shown in FIG. 3.

The operation of this system will be explained below based on the assumption that the first address, second address and the i-th address correspond to the latch circuits $L_1$ through $L_8$ (FIG. 2), latch circuits $L_9$ through $L_{16}$, and latch circuits $L_{m-7}$ through $L_m$, respectively. It is also assumed that the data from the first address, second address and i-th address of the numerical control apparatus are successively transferred to the machine 2.

Before the direct memory access operation of the direct memory access controller DMAC (FIG. 2) incorporated in the numerical control apparatus 1, a synchronization signal SYNC is generated by the transfer control circuit TRCN of the numerical control apparatus 1. This signal SYNC is transmitted to the machine 2 through the cable $L_2$ and is applied to the address counter ADC and the bit counter BTC to clear the contents of these counters.

Thereafter, as in the case of FIG. 2, the direct memory access controller DMAC starts to operate to successively read out the data from the memory (FIG. 2) and writes this data in a parallel manner in the shift register SFR. Thereafter, this data is transmitted to the data cable $L_o$ while being shifted bit-by-bit by the clock pulses CLK. That is, the parallel data is converted into serial data DATA and is transmitted in a bit-serial manner. Simultaneously, the clock pulses CLK are transmitted through the cable $L_1$ in order to show the positions of the serial data DATA.

In the machine 2, the transmitted serial data DATA is sampled by the clock pulses CLK. The sampled data is then serially written in the shift register SFRM while being shifted bit-by-bit and is then subjected to an S/P conversion. At the same time, the clock pulse CLK is delivered to the bit counter BTC so that the number of the clock pulses CLK is counted by the bit counter BTC. The bit counter BTC produces a carry pulse CP as it counts 8 (eight) clock pulses, the length of which corresponds to the length (8 bits) of the bit-serially transmitted data, and the address counter makes one carry by this carry pulse. The S/P conversion of the serial data DATA is completed when a carry is received by the address counter ADC, and the data is transferred from the shift register SFRM in a parallel manner into the latches $L_1$ through $L_8$ (FIG. 2) corresponding to the number counted by the address counter ADC, i.e. corresponding to the first address.

Thereafter, the content of the address counter ADC is carried step by step so that the address counter produces the first address signal, second address signal and the i-th address signal, which select the corresponding latches. The clock pulses CLK may be produced at the machine side in response to the synchronization signal SYNC.

As has been described, according to the invention, the signal to be transferred is exchanged in a bit-serial manner between the numerical control apparatus and the machine, after a P/S conversion, so that the number of cables is remarkably reduced and the wiring work is very much facilitated, while attaining highly reliable signal exchange. In addition, the data transfer time is further shortened if a synchronization signal is transmitted to the machine in place of the address to permit the machine to generate the address signal by itself. Furthermore, the load imposed on the central processing unit CPU is remarkably reduced if the numerical control apparatus incorporates the direct memory access controller DMAC, because, by so doing, the exchange of data between the machine and the numerical control apparatus is made under the control of the direct memory access controller DMAC.

What is claimed is:

1. A numerical controlling method for controlling a machine through an exchange of data between said machine and a numerical control apparatus, which method comprises the steps of:
    converting, in said numerical control apparatus, parallel data for controlling said machine into serial data;
    generating a parallel address signal in said numerical control apparatus, the address signal corresponding to circuitry in said machine which is to be operated by said parallel data;
    converting the address signal into a serial address signal in the numerical control apparatus;
    transmitting said serial data in a bit-serial manner to said machine;
    transmitting said serial address signal with the data to the machine;
    converting, in said machine, said serial data to parallel data;
    converting, in said machine, said serial address signal to a parallel address signal;
    decoding said address signal in said machine; and
    activating said circuitry in accordance with the result of the decoding.

2. A numerical controlling method for controlling a machine through an exchange of data between said machine and a numerical control apparatus, which method comprises the steps of:
- converting, in said numerical control apparatus, parallel data for controlling circuitry in said machine into serial data;
- generating, in said numerical control apparatus, a synchronization signal and clock signal pulses representing the bit position of the serial data;
- transmitting said serial data in a bit-serial manner to said machine;
- transmitting said synchronization signal and clock pulses to said machine;
- initially clearing a bit counter having a capacity corresponding to the bit number of the serial data;
- converting, in said machine, said serial data to parallel data;
- counting said clock pulses by the bit counter;
- counting the carry pulses from said bit counter by an address counter adapted to be cleared by said synchronization signal;
- using the number counted by said address counter as said address signal and decoding the address signal in said machine; and
- activating said circuitry in said machine in accordance with the result of the decoding.

3. A numerical controlling method for controlling a machine through an exchange of data between said machine and a numerical control apparatus, said method comprising:
- producing a parallel address signal in the numerical control apparatus;
- converting the address signal to a serial address signal in the numerical control apparatus;
- transmitting the serial address signal to the machine;
- converting the address signal to a parallel address signal in the machine;
- decoding the address signal in said machine;
- reading, in a parallel manner, the states of a plurality of elements in said machine in accordance with the result of the decoding;
- converting the parallel data to serial data;
- transmitting said serial data in a bit-serial manner to said numerical control apparatus;
- converting said serial data to parallel data in said numerical control apparatus; and
- storing said parallel data in a memory area which is indicated by the address signal.

4. A numerical controlling system for controlling a machine through an exchange of data between said machine and a numerical control apparatus, said system comprising:
- conversion means, provided in both of said numerical control apparatus and said machine, for converting parallel data to serial data and vice versa;
- clock signal generating means incorporated in said numerical control apparatus for producing a synchronization signal and a clock signal representing the bit position of said serial data;
- a bit counter incorporated in said machine and having a capacity corresponding to the bit number of said serial data, said bit counter being initially cleared by said synchronization signal;
- means incorporated in said machine and cooperating with said bit counter for generating an address signal, said means including an address counter which is cleared by said synchronization signal and which counts carry pulses from said bit counter;
- decoding means provided in said machine for decoding said address signal; and
- means for conveying serial data, after conversion from parallel by said conversion means, between said numerical control apparatus and said machine in order to activate the machine elements corresponding to said address signals in accordance with the data serially transmitted from said numerical control apparatus and to transfer the states of parallelly read machine elements corresponding to said address signals in a serial manner to said numerical control apparatus.

* * * * *

UNITED STATES PATENT AND TRADEMARK OFFICE
CERTIFICATE OF CORRECTION

PATENT NO. : 4,368,511
DATED : January 11, 1983
INVENTOR(S) : Imazeki

It is certified that error appears in the above-identified patent and that said Letters Patent is hereby corrected as shown below:

Col. 1, line 39, delete "a".

Col. 3, line 3, after "switches" insert --,--;
      line 45, [no paragraph].

Col. 4, line 23-24, "numericals" should be --numbers--;
      line 61, "." should be --:--;
      line 62, [no paragraph];
      line 66, [no paragraph].

Col. 5, line 1, [no paragraph];

Col. 6, line 15, "(AD" should be --AD--.

Col. 7, line 40, "i-th" should be --$\underline{i}$-th--;
      line 44, "i-th" should be --$\underline{i}$-th--.

Col. 8, line 20, "i-th" should be --$\underline{i}$-th--.

Signed and Sealed this

Ninth Day of August 1983

[SEAL]

Attest:

GERALD J. MOSSINGHOFF

Attesting Officer     Commissioner of Patents and Trademarks